US012693018B2

(12) United States Patent
Duckers et al.

(10) Patent No.: US 12,693,018 B2
(45) Date of Patent: Jul. 28, 2026

(54) FUEL INJECTOR AND METHODS OF USE

(71) Applicant: Solar Turbines Incorporated, San Diego, CA (US)

(72) Inventors: Jonathan Duckers, San Diego, CA (US); Steven M. Skinner, San Diego, CA (US); Angelica Orduno, San Diego, CA (US); Paul Economo, Carlsbad, CA (US); Michel Akiki, Menifee, CA (US); Donald J. Cramb, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 18/672,953

(22) Filed: May 23, 2024

(65) Prior Publication Data

US 2025/0361839 A1 Nov. 27, 2025

(51) Int. Cl.
F23R 3/28 (2006.01)
F23R 3/14 (2006.01)
F23R 3/34 (2006.01)
F02C 9/26 (2006.01)

(52) U.S. Cl.
CPC ............... F23R 3/286 (2013.01); F23R 3/14 (2013.01); F23R 3/283 (2013.01); F23R 3/343 (2013.01); *F02C 9/263* (2013.01)

(58) Field of Classification Search
CPC .. F02C 9/263; F23R 3/14; F23R 3/283; F23R 3/286; F23R 3/343
See application file for complete search history.

(56) References Cited

U.S. PATENT DOCUMENTS

| | | | | |
|---|---|---|---|---|
| 3,638,865 A | * | 2/1972 | McEneny | F23R 3/14 |
| | | | | 239/404 |
| 4,284,401 A | | 8/1981 | Tatebayashi et al. | |
| 4,854,127 A | | 8/1989 | Vinson et al. | |
| 5,323,614 A | * | 6/1994 | Tsukahara | F23R 3/34 |
| | | | | 60/737 |
| 5,411,394 A | * | 5/1995 | Beer | F23C 9/00 |
| | | | | 431/9 |
| 5,533,330 A | * | 7/1996 | Mullooly | F23R 3/283 |
| | | | | 60/39.821 |
| 5,983,642 A | * | 11/1999 | Parker | F23R 3/286 |
| | | | | 60/737 |
| 6,161,387 A | * | 12/2000 | Green | F23R 3/14 |
| | | | | 60/742 |
| 8,375,721 B2 | * | 2/2013 | Wilbraham | F23R 3/14 |
| | | | | 60/750 |

(Continued)

*Primary Examiner* — Ted Kim

(57) ABSTRACT

It has become increasingly necessary to offer low-emission systems, within gas turbine engines, that have emission warranties at lower engine loads. State-of-the-art solutions are expensive and complex. Accordingly, in an embodiment, the fuel-injection head of a fuel injector comprises a splitter that splits an annular passage for swirling an air-fuel mixture into two passages. In addition, the fuel injector is configured to independently supply fuel to each of the two passages to provide an internally variable fuel staged double swirler lean premix injector. This internal fuel staging allows for an extension of emission warranties at lower engine loads. Embodiments may also utilize gas streams to purge fuel away from surfaces inside the passages.

14 Claims, 10 Drawing Sheets

(56) References Cited

U.S. PATENT DOCUMENTS

| | | | | | |
|---|---|---|---|---|---|
| 8,561,409 | B2 * | 10/2013 | Milosavljevic | ......... | F23R 3/346 |
| | | | | | 60/737 |
| 9,285,122 | B2 * | 3/2016 | Jones | ...................... | B05B 1/262 |
| 9,366,190 | B2 * | 6/2016 | Cramb | ................... | F23R 3/286 |
| 9,534,790 | B2 | 1/2017 | Cai et al. | | |
| 11,131,460 | B2 | 9/2021 | Muldal et al. | | |
| 11,300,293 | B2 | 4/2022 | Tentorio et al. | | |
| 2002/0112480 | A1 * | 8/2002 | McMillan | ............... | F23R 3/286 |
| | | | | | 60/737 |
| 2007/0017224 | A1 * | 1/2007 | Li | ............................ | F23R 3/14 |
| | | | | | 60/748 |
| 2008/0168773 | A1 * | 7/2008 | Sandelis | ................... | F23R 3/14 |
| | | | | | 60/748 |
| 2009/0212139 | A1 * | 8/2009 | Thomson | .................. | F23R 3/28 |
| | | | | | 60/740 |
| 2010/0126176 | A1 * | 5/2010 | Kim | .......................... | F23R 3/14 |
| | | | | | 239/399 |
| 2012/0234013 | A1 * | 9/2012 | Overman | ............... | F23R 3/283 |
| | | | | | 60/746 |
| 2017/0191667 | A1 * | 7/2017 | Spivey | .................... | F23R 3/286 |
| 2017/0299189 | A1 | 10/2017 | Edmonds et al. | | |
| 2023/0266012 | A1 * | 8/2023 | Kool | ......................... | F02C 7/30 |
| | | | | | 60/777 |

* cited by examiner

FUEL INJECTOR AND METHODS OF USE

TECHNICAL FIELD

The embodiments described herein are generally directed to a fuel injector, and, more particularly, to an internally variable fuel staged double swirler lean premixed injector.

BACKGROUND

For gas turbine engines, it has become increasingly necessary to offer low-emissions systems with emission warranties at loads that are lower than currently achievable. An example of a low-emissions system is the SoloNOx™ system, offered by Solar Turbines Inc. of San Diego, California.

Commonly, turndown control methods, such as bleed and guide vane modulation, are used. However, these methods decrease load efficiency in the gas turbine engine. In addition, the development and use of variable nozzles and external fuel staging has proven expensive and complex.

A simpler, cost-effective solution is required. There are a number of lean premixed fuel injectors in the art. Examples are disclosed in U.S. Pat. No. 9,534,790, issued on Jan. 3, 2017, U.S. Pat. No. 11,131,460, issued on Sep. 28, 2021, and U.S. Pat. No. 11,300,293, issued on Apr. 12, 2022. The present disclosure is directed toward overcoming one or more of the problems discovered by the inventors.

SUMMARY

In an embodiment, a fuel-injection head comprises: a premix tube extending downstream from an injection body; a plurality of vanes extending downstream from the injection body, wherein the plurality of vanes are arranged annularly around an upstream end of the premix tube; a barrel extending downstream from the plurality of vanes, wherein the barrel is annular around a downstream end of the premix tube, so as to define an annular passage that comprises a radial portion that extends radially through the plurality of vanes, an axial portion that extends axially between the barrel and the downstream end of the premix tube, and a transitional portion that transitions between the radial portion and the axial portion; and a splitter that splits the annular passage into a first annular passage and a second annular passage.

In an embodiment, a fuel injector comprises: a fuel-injection head that includes an injection body comprising a first fuel gallery and a second fuel gallery, a pilot system extending downstream from the injection body and configured to inject pilot fuel, a premix tube extending downstream from the injection body and encircling at least a downstream portion of the pilot system, a plurality of vanes extending downstream from the injection body, wherein the plurality of vanes are arranged annularly around an upstream end of the premix tube, wherein each of the plurality of vanes comprises a plurality of fuel outlets that are arranged in at least one row that extends axially, wherein an upstream subset of the plurality of fuel outlets is in fluid communication with the first fuel gallery and a downstream subset of the plurality of fuel outlets is in fluid communication with the second fuel gallery, a barrel extending downstream from the plurality of vanes, wherein the barrel is annular around a downstream end of the premix tube, so as to define an annular passage that comprises a radial portion that extends radially through the plurality of vanes, an axial portion that extends axially between the barrel and the premix tube, and a transitional portion that transitions between the radial portion and the axial portion, and a splitter that splits the annular passage into a first annular passage and a second annular passage, wherein the splitter extends radially into the radial portion of the annular passage, such that, in the radial portion of the annular passage, the first annular passage is upstream from the second annular passage, and wherein the splitter further splits the at least one row such that the upstream subset of the plurality of outlets is in fluid communication with the first annular passage and the downstream subset of the plurality of outlets is in fluid communication with the second annular passage; a first fuel inlet that is in fluid communication with the first fuel gallery; a second fuel inlet that is in fluid communication with the second fuel gallery; and a pilot fuel inlet that is in fluid communication with the pilot system.

In an embodiment, a method of operating a fuel injector that comprises a premix tube extending downstream from an injection body, a plurality of vanes extending downstream from the injection body, wherein the plurality of vanes are arranged annularly around an upstream end of the premix tube, a barrel extending downstream from the plurality of vanes, wherein the barrel is annular around a downstream end of the premix tube, so as to define an annular passage that comprises a radial portion that extends radially through the plurality of vanes, an axial portion that extends axially between the barrel and the premix tube, and a transitional portion that transitions between the radial portion and the axial portion, a splitter that splits the annular passage into a first annular passage and a second annular passage, a first fuel inlet that is in fluid communication with the first annular passage, and a second fuel inlet that is in fluid communication with the second annular passage, comprises: controlling a first fuel valve connected to the first fuel inlet to supply a first fuel stream to the first annular passage; and controlling a second fuel valve connected to the second fuel inlet to supply a second fuel stream to the second annular passage; wherein the controlling of the first fuel valve is independent from the controlling of the second fuel valve.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
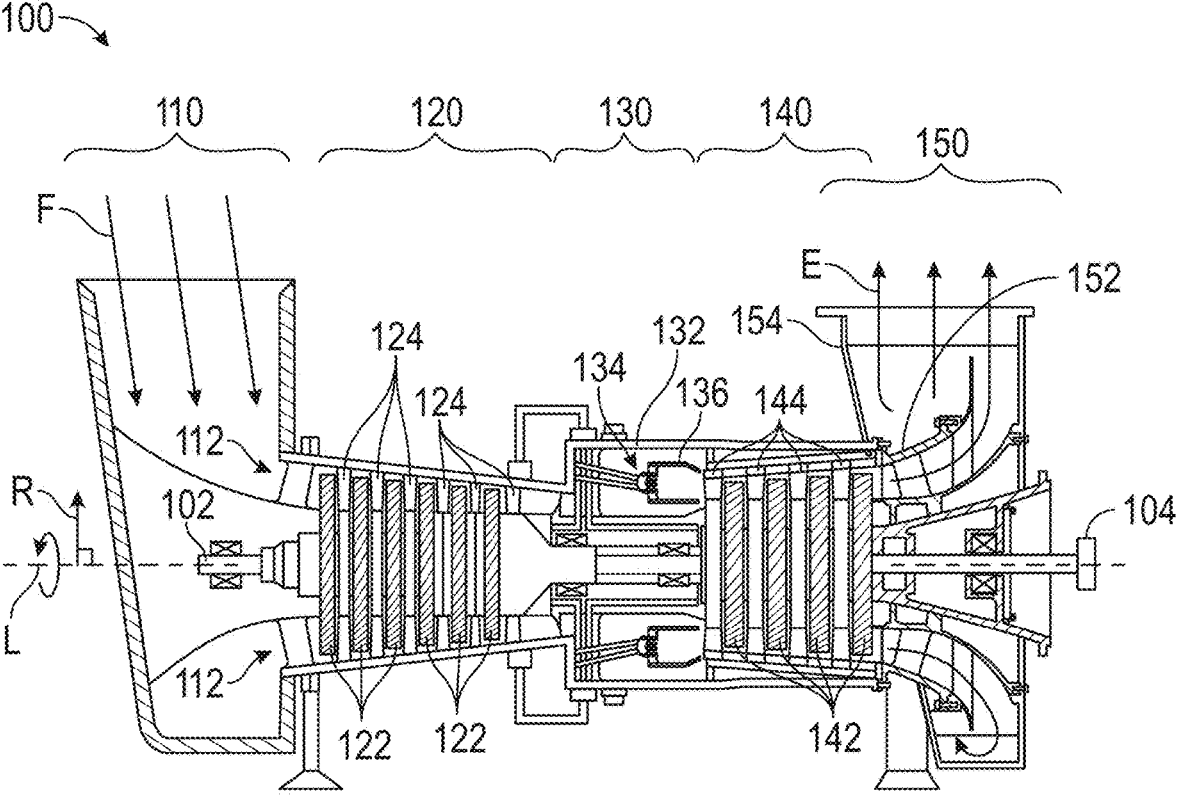
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

References herein to "upstream" and "downstream" or "forward" and "aft" are relative to the flow direction of the primary gas (e.g., air or fuel) being discussed, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground). In addition, the terms "respective" and "respectively" signify an association between members of a group of first components and members of a group of second components. For example, the phrase "each component A connected to a respective component B" would signify A1 connected to B1, A2 connected to B2, . . . and AN connected to BN. Furthermore, as used herein, a reference numeral with an appended letter will be used to refer to a specific component, whereas the same reference numeral without any appended letter will be used to refer collectively to a plurality of the component or to refer to a generic or arbitrary instance of the component.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular around longitudinal axis L. A radial axis may refer to any axis or direction that radiates outward from longitudinal axis L at a substantially orthogonal angle to longitudinal axis L, such as radial axis R in FIG. 1.

More generally, the term "radially outward" should be understood to mean farther from or away from the axis being discussed (e.g., longitudinal axis L, an injector axis, etc.), whereas the term "radially inward" should be understood to mean closer to or towards the axis being discussed. As used herein, the term "radial" will refer to any axis or direction that is substantially perpendicular to the axis being discussed, and the term "axial" will refer to any axis or direction that is substantially parallel to the axis being discussed.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. It is generally contemplated that working fluid F will be air. However, it should be understood that working fluid F could comprise other fluids, including other gases.

Compressor 120 may comprise a series of compressor rotor assemblies 122 and compressor stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged annularly around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

Turbine 140 may comprise one or more turbine rotor assemblies 142 and turbine stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred via power output coupling 104 (e.g., to an external system), as well as to compressor 120 via shaft 102.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
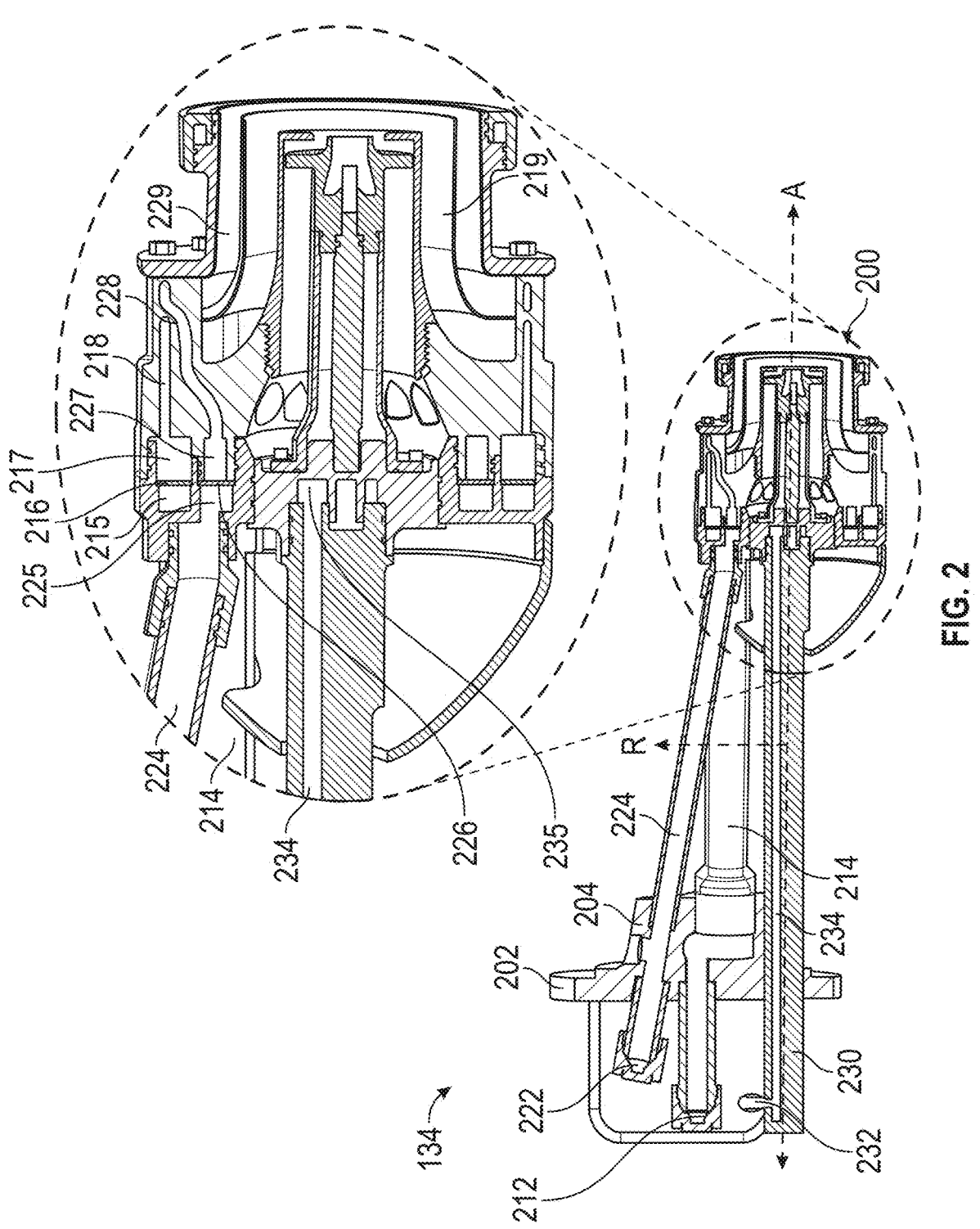
FIG. 2 illustrates fuel paths within a cross-sectional view of a fuel injector, according to an embodiment.

FIG. 2 illustrates fuel paths within a cross-sectional view of fuel injector 134, according to an embodiment. In the illustrated embodiment, fuel injector 134 comprises a flange 202, a distribution block 204, a first main-fuel tube 214, a second main-fuel tube 224, a tube stem 230, and a fuel-injection head 200, assembled along an injector axis A. Injector axis A corresponds to a longitudinal axis of tube stem 230 and fuel-injection head 200. In embodiments in which combustor 130 comprises a plurality of fuel injectors 134, each of the plurality of fuel injectors 134 may be identical in structure.

Flange 202 may be a cylindrical disk comprising apertures and handles for fastening fuel injector 134 to combustor case 130. As illustrated, the center of flange 202 may be offset from injector axis A. Distribution block 204 may extend downstream from the downstream side of flange 202 to support first main-fuel tube 214 and second main-fuel tube 224. Flange 202 and distribution block 204 may be formed from a single integral piece of material, or may be formed as separate pieces of material that are joined by any known means. Distribution block 204 acts as a manifold for one or more fuel circuits that distribute the flow of fuel through first main-fuel tube 214 and second main-fuel tube 224. Tube stem 230 may extend through flange 202 along injector axis A.

The upstream end of first main-fuel tube 214 may be connected to a downstream end of distribution block 204 and comprise a hollow interior that is in fluid communication with a first main-fuel fitting 212, via a channel through flange 202 and distribution block 204. First main-fuel tube 214 may extend from the downstream end of distribution block 204 to a first cavity 215 within fuel-injection head 200. While first main-fuel tube 214 is illustrated as being parallel to injector axis A, first main-fuel tube 214 may alternatively be at an angle with respect to injector axis A.

First fuel cavity 215 may be in fluid communication with a first fuel gallery 217 through a first perforated plate 216. The perforations in first perforated plate 216 may be configured in size, shape, spacing, and/or density to restrict fluid flow and dampen the oscillation response of combustor 130. First fuel cavity 215, first perforated plate 216, and first fuel gallery 217 may all be annular around injector axis A. First fuel gallery 217 may be in fluid communication with a plurality of first fuel-injection channels 218 that extend downstream from first fuel gallery 217 and are arranged annularly around injector axis A at equidistant intervals.

A first main-fuel path is formed from a first fuel inlet of first main-fuel fitting 212, through flange 202 and distribution block 204, through first main-fuel tube 214, through first cavity 215, through first perforated plate 216, through first fuel gallery 217, and through first fuel-injection channels 218. As will be discussed elsewhere herein, first fuel-injection channels 218 may inject main fuel into a first annular passage 219 within fuel-injection head 200. Thus, the first fuel inlet of first main-fuel fitting 212 is in fluid communication with first annular passage 219, such that main fuel may be injected into first annular passage 219. In particular, a first fuel valve, connected to the first fuel inlet, may be controlled to supply a first fuel stream to first annular passage 219 through the first main-fuel path.

An upstream end of second main-fuel tube 224 may be connected to the downstream end of distribution block 204 and comprise a hollow interior that is in fluid communication with a second main-fuel fitting 222, via a channel through flange 202 and distribution block 204. Second main-fuel tube 224 may extend from the downstream end of distribution block 204 to a second cavity 225 within fuel-injection head 200. While second main-fuel tube 224 is illustrated as being at an angle with respect to injector axis A, second main-fuel tube 224 may alternatively be parallel to injector axis A.

Second fuel cavity 225 may be in fluid communication with a second fuel gallery 227 through a second perforated plate 226. The perforations in second perforated plate 226 may be configured in size, shape, spacing, and/or density to restrict fluid flow and dampen the oscillation response of combustor 130. Second fuel cavity 225, second perforated plate 226, and second fuel gallery 227 may all be annular around injector axis A. Second fuel gallery 227 may be in fluid communication with a plurality of second fuel-injection channels 228 that extend downstream from second fuel gallery 227 and are arranged annularly around injector axis A at equidistant intervals.

A second main-fuel path is formed from a second fuel inlet of second main-fuel fitting 222, through flange 202 and distribution block 204, through second main-fuel tube 224, through second cavity 225, through second perforated plate 226, through second fuel gallery 227, and through second fuel-injection channels 228. As will be discussed elsewhere herein, second fuel-injection channels 228 may inject main fuel into a second annular passage 229 through fuel-injection head 200. Thus, the second fuel inlet of second main-fuel fitting 222 is in fluid communication with second annular passage 229, such that main fuel may be injected into second annular passage 229. In particular, a second fuel valve, connected to the second fuel inlet, may be controlled to supply a second fuel stream to second annular passage 229 through the second main-fuel path. Control of the second fuel valve may be independent from control of the first fuel valve, and vice versa. In addition, the second main-fuel path may be discrete from the first main-fuel path, such that there is no fluid communication between the first and second main-fuel paths.

As illustrated, first cavity 215 and second cavity 225 may each be shaped as an annulus, with second cavity 225 nested or otherwise positioned radially inward from first cavity 215, first perforated plate 216 and second perforated plate 226 may each be shaped as an annulus, with second perforated plate 226 nested or otherwise positioned radially inward from first perforated plate 216, and first fuel gallery 217 and second fuel gallery 227 may each be shaped as an annulus, with second fuel gallery 227 nested or otherwise positioned radially inward from first fuel gallery 217. In contrast, first annular passage 219 and second annular passage 229 may each have a conical shape, with first annular passage 219 nested or otherwise positioned axially upstream and radially inward from second annular passage 229. In an alternative embodiment, second annular passage 229 may be nested or otherwise positioned axially upstream and radially inward from first annular passage 219.

Tube stem 230 may comprise a pilot-fuel fitting 232 with a pilot-fuel inlet that is in fluid communication with a pilot-fuel channel 234 through tube stem 230. Pilot-fuel channel 234 may extend axially through tube stem 230 to a pilot-fuel gallery 235. Thus, a pilot-fuel path is formed from the pilot-fuel inlet of pilot-fuel fitting 232, through pilot-fuel channel 234, into pilot-fuel gallery 235, which may supply a pilot-fuel injection system, as described in more detail elsewhere herein. A fuel valve, connected to the pilot-fuel inlet, may be controlled to supply a pilot-fuel stream to the pilot-fuel injection system through this pilot-fuel path.

Figure 3:
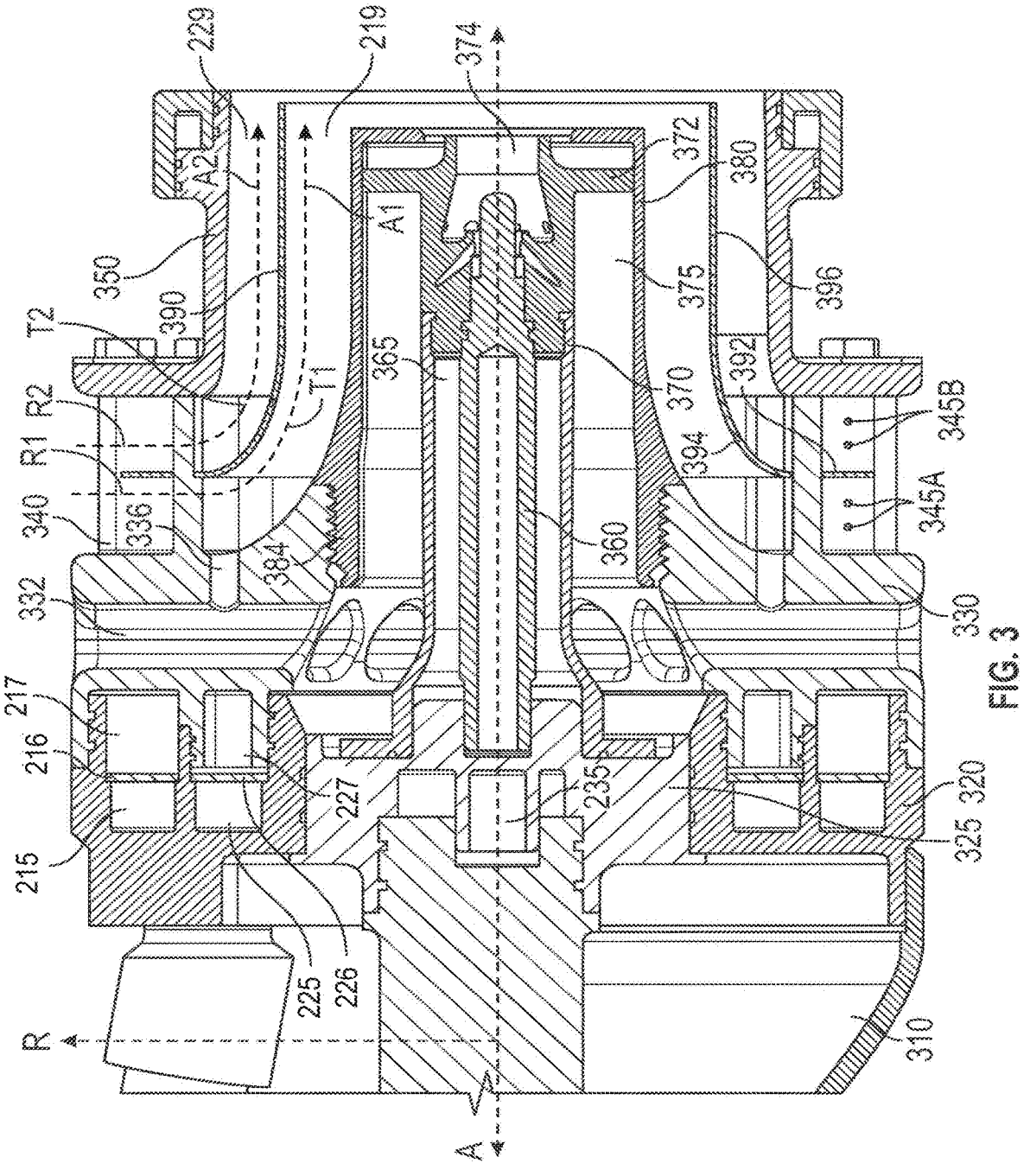
FIG. 3 illustrates a cross-sectional view of a fuel-injection head, according to an embodiment.

FIG. 3 illustrates a cross-sectional view of fuel-injection head 200, according to an embodiment. This cross-sectional view is in a cut plane that includes injector axis A and a radial axis R. Fuel-injection head 200 may comprise, from the upstream end to the downstream end, along injector axis A, an outer cap 310, a first portion 320 and second portion 330 of an injection body, a plurality of vanes 340, and a barrel 350. It should be understood that each of these components may be formed from a single integral piece of material, or may be formed as separate pieces of material that are joined by any known means. In addition, two or more of these components may be formed from a single integral piece of material, or may be formed as separate pieces of material that are joined by any known means. Thus, the fact that each component is described separately does not mean that the components are necessarily manufactured as separate components.

Outer cap 310 may be a dome-shaped cap that is connected to the upstream end of first portion 320 of the injection body. The contours of outer cap 310 may be designed to enable working fluid F, exiting compressor 120, to flow smoothly or in any other suitable manner around the upstream end of fuel-injection head 200.

The downstream end of first portion 320 may be connected to the upstream end of second portion 330. First portion 320 of the injection body may comprise a radially inner section 325 that defines pilot-fuel gallery 235. First portion 320 and second portion 330 may both comprise a radially outer section that collectively define first fuel cavity 215, first fuel gallery 217, second fuel cavity 225, and second fuel gallery 227, as well as fix first perforated plate 216 into position between first fuel cavity 215 and first fuel gallery 217 and fix second perforated plate 226 into position between second fuel cavity 225 and second fuel gallery 227.

A pilot-fuel injection system may comprise a pilot system, which includes a pilot tube 360 around injector axis A and a central tube 370 that is coaxial with and encircles pilot tube 360, and a premix tube 380 that is coaxial with and encircles central tube 370. Pilot-fuel gallery 235 may be in fluid communication with an annular pilot-fuel channel 365 between pilot tube 360 and central tube 370, via one or more substantially axial channels (not shown). The downstream end of central tube 370 may comprise a pilot block 372. Annular pilot-fuel channel 365 may be in fluid communication with a pilot premix area 374 that is downstream of pilot block 372, via one or more substantially axial channels (not shown). Thus, pilot fuel is able to flow from pilot-fuel gallery 235, through annular pilot-fuel channel 365, through pilot block 372, into pilot premix area 374.

Premix tube 380, which extends downstream from the injection body, comprising first portion 320 and second portion 330, and is coaxial around at least a downstream portion of central tube 370, defines the outer boundary of an annular gas channel 375 between central tube 370 and premix tube 380. Second portion 330 may comprise a plurality of radial gas channels 332, arranged annularly around injector axis A, that are each in fluid communication with annular gas channel 375. Thus, working fluid F, around the exterior of fuel-injection head 200, may flow radially through each of the plurality of radial gas channels 332, and then axially through annular gas channel 375. When pilot fuel is being supplied through pilot-fuel fitting 232, working fluid F mixes with the pilot fuel in pilot premix area 374 at the downstream end of annular gas channel 375. In this case, working fluid F is mixed with pilot fuel, and this mixture of working fluid F and pilot fuel is ejected from an opening in the downstream end of premix tube 380.

Second portion 330 may also comprise a plurality of axial channels 336, arranged annularly around injector axis A. Each axial channel 336 may extend axially between a radial gas channel 332 and first annular passage 219. In an embodiment, there is at least one or exactly one axial channel 336 extending from each radial gas channel 332. Thus, a portion of working fluid F, flowing through each axial gas channel 336 is diverted axially, by a corresponding axial channel 336, into first annular passage 219.

The entire pilot-fuel injection system may be removably mounted within fuel-injection head 200. For example, pilot tube 360 may be inserted into a socket within radially inner section 325 of first portion 320 of the injection body. Then, central tube 370 with pilot block 372 may be inserted around pilot tube 360, and fixed to radially inner section 325 via a plurality of fasteners that are arranged annularly around injector axis A and/or by other fastening means. The downstream end of pilot tube 360 may extend, along injector axis A, into, and potentially through, pilot block 372, such that pilot tube 360 is fixed in place by the combination of the socket and pilot block 372, which is fixed to central tube 370, which is fixed to radially inner section 325. In addition, the upstream end of premix tube 380 may be inserted around central tube 370 and into an aperture through the downstream end of second portion 330 of the injection body. The upstream end of premix tube 380 may comprise engagement members 384 that are configured to engage with corresponding engagement members in the aperture, to thereby fix premix tube 380 into position within the aperture in second portion 330 of the injection body. For example, the aperture may be threaded, and the upstream end of premix tube 380 may comprise a threaded radially outward facing surface, as engagement members 384, that is configured to mate with the threaded aperture in second portion 330 of the injection body.

It should be understood that the pilot-fuel injection system may be removed from fuel-injection head 200 in the reverse order of how the pilot-fuel system was assembled into fuel-injection head 200. In particular, premix tube 380 may be removed from the injection body by disengaging engagement members 384 from the corresponding engagement members in the aperture (e.g., threaded aperture) of second portion 330 of the injection body, then central tube 370 with pilot block 372 may be removed (e.g., by unfastening applicable fasteners), and then pilot tube 360 may be removed by pulling pilot tube 360 axially out of the socket in radially inner section 325.

A plurality of vanes 340 extend downstream from the injection body. In particular, each of the plurality of vanes 340 extends axially from the downstream end of second portion 330 at a radially outward position, such that the plurality of vanes 340 encircle at least a portion of the pilot-fuel injection system. The plurality of vanes 340 are arranged annularly around injector axis A and around an upstream end of premix tube 380. In addition, the plurality of vanes 340 are spaced apart from each other by equidistant intervals. Thus, a space exists between each adjacent pair of vanes 340. Each space provides fluid communication from an exterior of fuel-injection head 200 to an annular passage between barrel 350 and premix tube 380. In particular, barrel 350 extends downstream from the plurality of vanes 340 and is annular around a downstream end of premix tube 380, so as to define an annular passage, comprising a radial portion that extends radially through the plurality of vanes 340, an axial portion that extends axially between barrel 350 and the downstream end of premix tube 380, and a transitional portion that transitions between the radial portion and the axial portion. Thus, working fluid F, around the exterior of fuel-injection head 200, may flow radially through the spaces between adjacent vanes 340, and then transition to flow axially through the annular passage between barrel 350 and premix tube 380.

In an embodiment, the annular passage, between barrel 350 and premix tube 380, including the spaces between adjacent vanes 340, is split into first annular passage 219 and second annular passage 229. In particular, fuel-injection head 200 may comprise a splitter 390 that is fixed within the annular passage to split the annular passage into first annular passage 219 and second annular passage 229. Splitter 390 may comprise a radial section 392 within the radial portion of the annular passage, an axial section 396 within the axial portion of the annular passage, and a transitional section 394 that transitions between radial section 392 and axial section 396 within the transitional portion of the annular passage. It should be understood that, as a result of splitter 390, each of first annular passage 219 and second annular passage 229 will comprise a region of the radial portion, transitional portion, and axial portion of the annular passage. For example, first annular passage 219 comprises radial portion R1, transitional portion T1, and axial portion A1, whereas second annular passage 229 comprises radial portion R2, transitional portion T2, and axial portion A2.

Splitter 390 may extend radially into the radial portion of the annular passage, such that, in the radial portion of the annular passage, first annular passage 219 is upstream from second annular passage 229. In particular, radial portion R1 of first annular passage 219 is upstream from radial portion R2 of second annular passage 229.

Splitter 390 may extend into the transitional portion of the annular passage, such that, in the transitional portion of the annular passage, first annular passage 219 begins upstream of second annular passage 229 and curves or otherwise transitions to radially inward from second annular passage 229. In particular, transitional portion T1 of first annular passage 219 starts upstream from transitional portion T2 of second annular passage 229 and curves to radially inward from transitional portion T2 of second annular passage 229.

Splitter 390 may extend axially into the axial portion of the annular passage, such that, in the axial portion of the annular passage, first annular passage 219 is radially inward from second annular passage 229. In particular, axial portion A1 of first annular passage 219 is radially inward from axial portion A2 of second annular passage 229.

Each of the plurality of vanes 340 may comprise a plurality of fuel outlets 345. For each of the plurality of vanes 340, the plurality of fuel outlets 345 may be arranged in at least one row that extends axially along a side of the vane 340 that faces the radial portion of the annular passage, in the space between the vane 340 and an adjacent vane 340. Splitter 390 splits each row of fuel outlets 345 into an upstream or first subset 345A that is in fluid communication with first annular passage 219, and a downstream or second subset 345B that is in fluid communication with second annular passage 229. First fuel gallery 217 is in fluid communication with first subset 345A, and second fuel gallery 227 is in fluid communication with second subset 345B. In particular, first subset 345A of the plurality of fuel outlets 345 in each vane 340 is in fluid communication with one of first fuel-injection channels 218, which is in fluid communication with first fuel gallery 217, and second subset 345B of the plurality of fuel outlets 345 in each vane 340 is in fluid communication with one of second fuel-injection channels 228, which is in fluid communication with second fuel gallery 227. Thus, main fuel may be supplied through the first fuel inlet of first main-fuel fitting 212 to the first main-fuel path, which ejects the main fuel into first annular passage 219 via first subset 345A of fuel outlets 345 in each vane 340. Similarly, main fuel may be supplied through the second fuel inlet of second main-fuel fitting 222 to the second main-fuel path, which ejects main fuel into second annular passage 229 via second subset 345B of fuel outlets 345 in each vane 340. The supply of main fuel to the first and second fuel inlets may be controlled independently, such that different rates of main fuel may be supplied to first annular passage 219 and second annular passage 229, and/or main fuel may be supplied to one of first annular passage 219 and second annular passage 229 while no fuel is supplied to the other one of first annular passage 219 and second annular passage 229.

Figure 4:
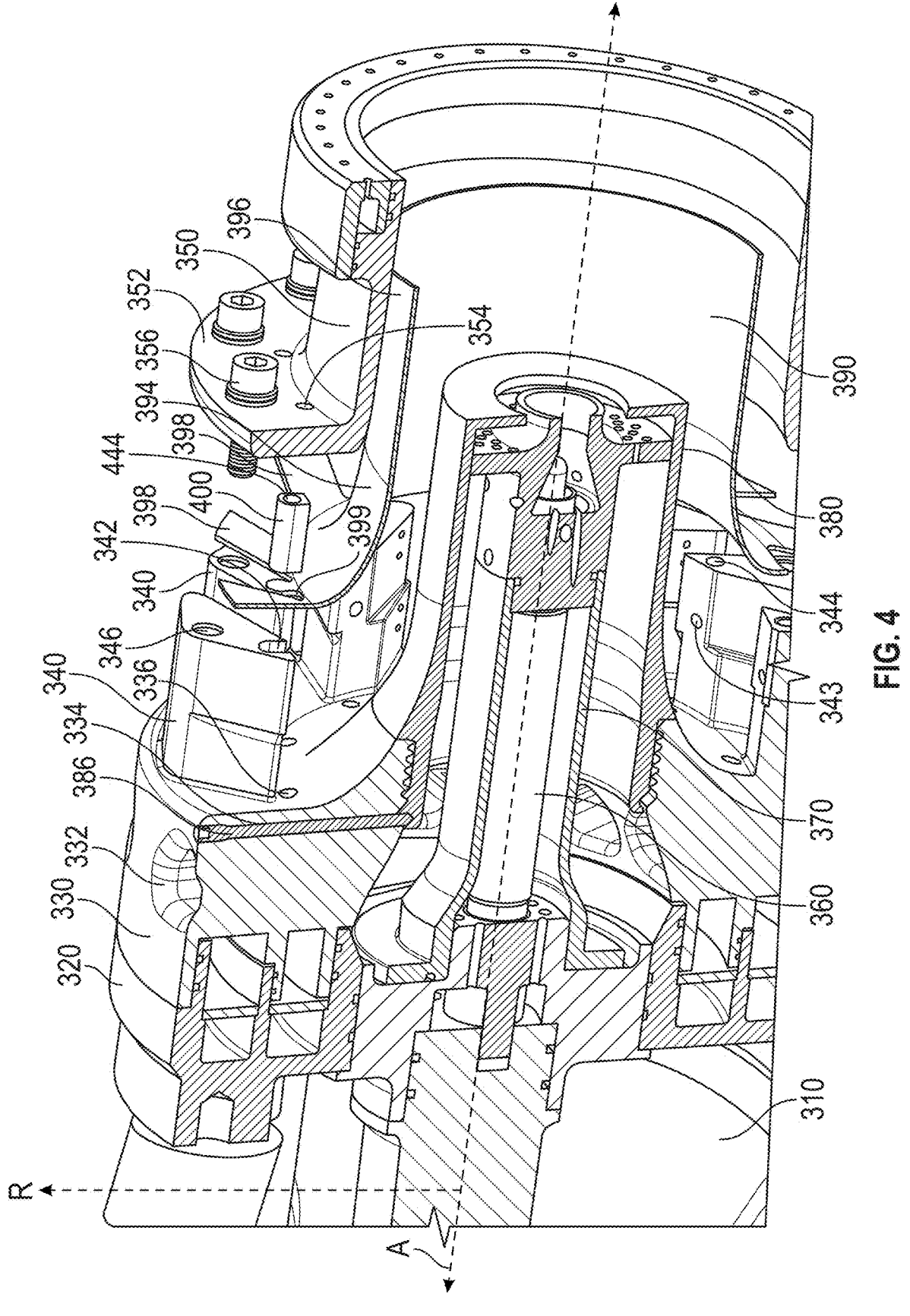
FIG. 4 illustrates a partially-exploded cross-sectional perspective view of a fuel-injection head, according to an embodiment.

FIG. 4 illustrates a partially-exploded cross-sectional perspective view of fuel-injection head 200, according to an embodiment. As illustrated, the injection body (e.g., second portion 330) may comprise at least one radial aperture 334 that radially extends through a radially outward facing surface of the injection body, through the injection body, and into the aperture (e.g., threaded aperture) of second portion 330. A radial pin 386 may be inserted through each radial aperture 334 to engage with the threaded radially outward facing surface of premix tube 380, to thereby prevent rotation of premix tube 380 with respect to the injection body. While only a single radial aperture 334 is illustrated, it should be understood that the injection body may comprise a plurality of radial apertures 334 that are each fitted with a radial pin 386.

In an embodiment, radial section 392 of splitter 390 may comprise a plurality of radial spokes 398. Each radial spoke 398 is configured (e.g., sized and shaped) to extend between an adjacent pair of the plurality of vanes 340. In particular, each radial spoke 398 may radially and annularly fill the space between adjacent vanes 340, so as to divide radial portion R1 of first annular passage 219 from radial portion R2 of second annular passage 219. The number of radial spokes 398 may equal the number of the plurality of vanes 340, such that each adjacent pair of vanes 340 has a respective one of the plurality of radial spokes 398 extending therebetween.

In an embodiment, radial section 392 of splitter 390 may comprise one or more, and preferably a plurality of, radial tabs 399. Each radial tab 399 is configured (e.g., sized and shaped) to extend into an axial groove 342 within a respective one of the plurality of vanes 340. Axial groove 342 may be positioned on a radially inward facing surface of one or more, and preferably a plurality of (e.g., three or more), vanes 340. Axial groove 342 may be open on a downstream end of vane 340, and extend axially upstream for only a portion of the axial length of vane 340. Not every one of the plurality of vanes 340 must have an axial groove 342. However, the number of vanes 340 that comprise an axial groove 342 should be equal to the number of radial tabs 399. In addition, the positioning of the vane(s) 340 comprising an axial groove 342 should align with the positions of radial tabs 399 of splitter 390, such that, when radial spokes 398 are positioned between adjacent pairs of vanes 340, each radial tab 399 is positioned within an axial groove 342. The total number of radial tabs 399 and aligned axial grooves 342 should also be sufficient to stably support splitter 390 from sliding or flexing in an axial direction during operation of fuel injector 134. After a radial tab 399 has been inserted in axial groove 342 of a respective vane 340 (e.g., in an upstream direction), an insert 400 may be inserted (e.g., in the upstream direction) to thereby sandwich radial tab 399 between an upstream end of axial groove 342 and insert 400.

In an embodiment, barrel 350 comprises a flange 352. Flange 352 may be a cylindrical disk comprising axial apertures 354 and apertures (not visible) for fastening barrel 350 to vanes 340. Axial apertures 354 in flange 352 of barrel 350 may be aligned with corresponding axial apertures 344 in vanes 340, such that each axial aperture 354 is in fluid communication with an axial aperture 344 along an axial axis. In the event that a vane 340 comprises an insert 400, the corresponding axial aperture 354 will align with an axial aperture 444 in insert 400. Once aligned, a fastener 356 may be inserted upstream through each aperture in flange 352 to engage with aperture 346 of a respective vane 340. Fastener 356 may be a screw, and aperture 346 may be threaded so as to mate with the screw, to thereby secure barrel 350 to the plurality of vanes 340. Thus, flange 352 is fixed to a downstream end of each of the plurality of vanes 340, so as to fix each radial tab 399 and each insert 400 within axial groove 342 of a respective vane 340, and such that each axial aperture 354 in flange 352 of barrel 350 is aligned with an axial aperture 344 in a corresponding vane 340 or an axial aperture 444 in a corresponding insert 400.

Because each axial aperture 354 in flange 352 of barrel 350 is aligned with a corresponding axial aperture 344 or 444, working fluid F, around the exterior of fuel-injection head 200, may flow axially through each axial aperture 354 into the corresponding axial aperture 344 or 444. Each axial aperture 344 may be in fluid communication, via an internal channel within vane 340, with a radial outlet 343 extending towards injector axis A and positioned within second annular passage 229. Similarly, each axial aperture 444 may be in fluid communication, via an internal channel within insert 400, with a radial outlet (not shown) extending towards injector axis A and positioned within second annular passage 229. Thus, working fluid F flows axially through axial apertures 354 into axial apertures 344 and 444 and out of radial apertures into second annular passage 229.

Notably, each insert 400 is positioned downstream from a respective one of radial tabs 399, within axial groove 342 of a respective vane 340, to thereby be sandwiched between a respective radial tab 399 on an upstream end and flange 352 on a downstream end. This prevents insert 400 from sliding in an axial direction. This also secures each radial tab 399 within axial groove 342 of a respective vane 340, to prevent any sliding of splitter 390 in an axial direction. Insert 400 may have a generally U-shaped or other non-circular profile, in a cross section that is perpendicular to injector axis A, so as to prevent insert 400 from rotating within axial groove 342 during operation of fuel injector 134.

Figure 5:
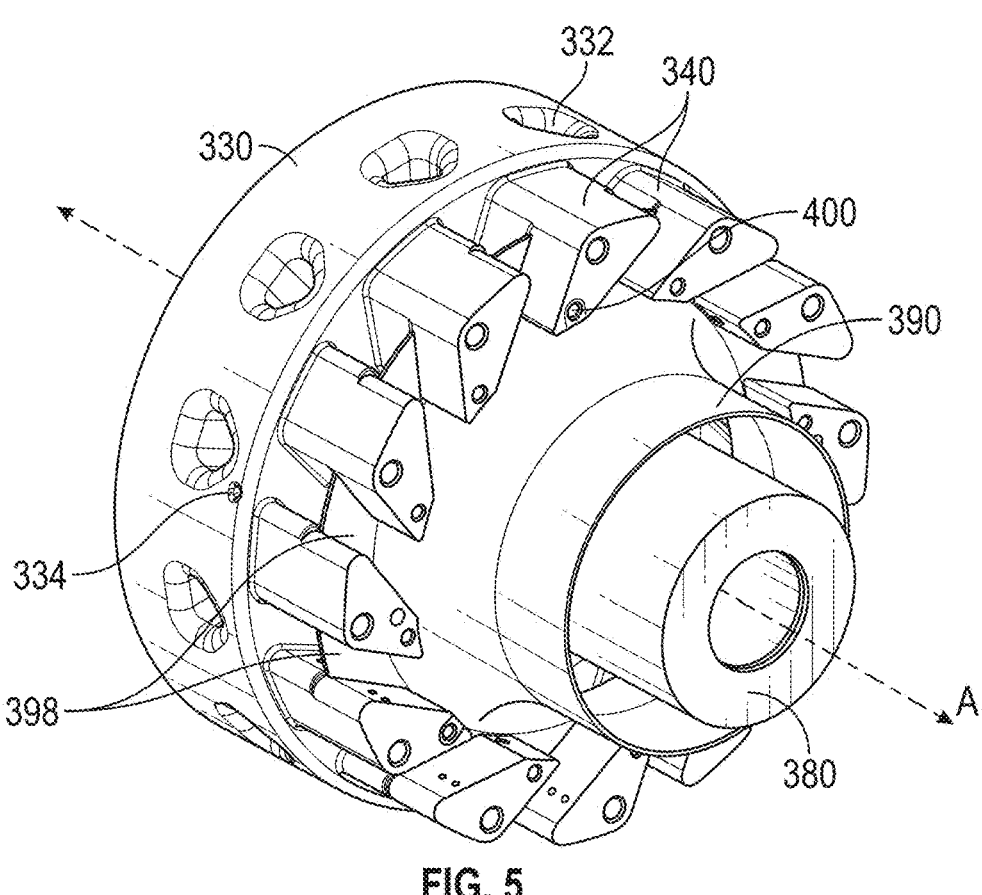
FIG. 5 illustrates a perspective view of an assembly of a fuel-injection head, according to an embodiment.

FIG. 5 illustrates a perspective view of an assembly of fuel-injection head 200, according to an embodiment. In particular, the illustrated assembly comprises second portion 330 of the injection body, premix tube 380, and splitter 390. As illustrated, each radial spoke 398 is positioned within the space between adjacent vanes 340, and has a profile that matches the profile of the space, in a plane that is perpendicular to injector axis A. Notably, the profile of each space and the respective radial spoke 398 may have an angular shape, such as a rhombus, in a plane that is perpendicular to injector axis A and includes radial axis R. It should be understood that the exact shape of this profile will be dictated by the cross-sectional shape of vanes 340 in the same plane. Inserts 400 are shown within axial grooves 342 of respective vanes 340, to thereby secure respective radial tabs 399. In the illustrated embodiment, there are at least three vanes 340 with axial grooves 342. However, in alternative embodiments, there may be any number of vanes 340 with axial grooves (e.g., one, two, four, five, ten, etc.), as long as there is an identical number of radial tabs 399 in radial section 392 of splitter 390.

Figure 6:
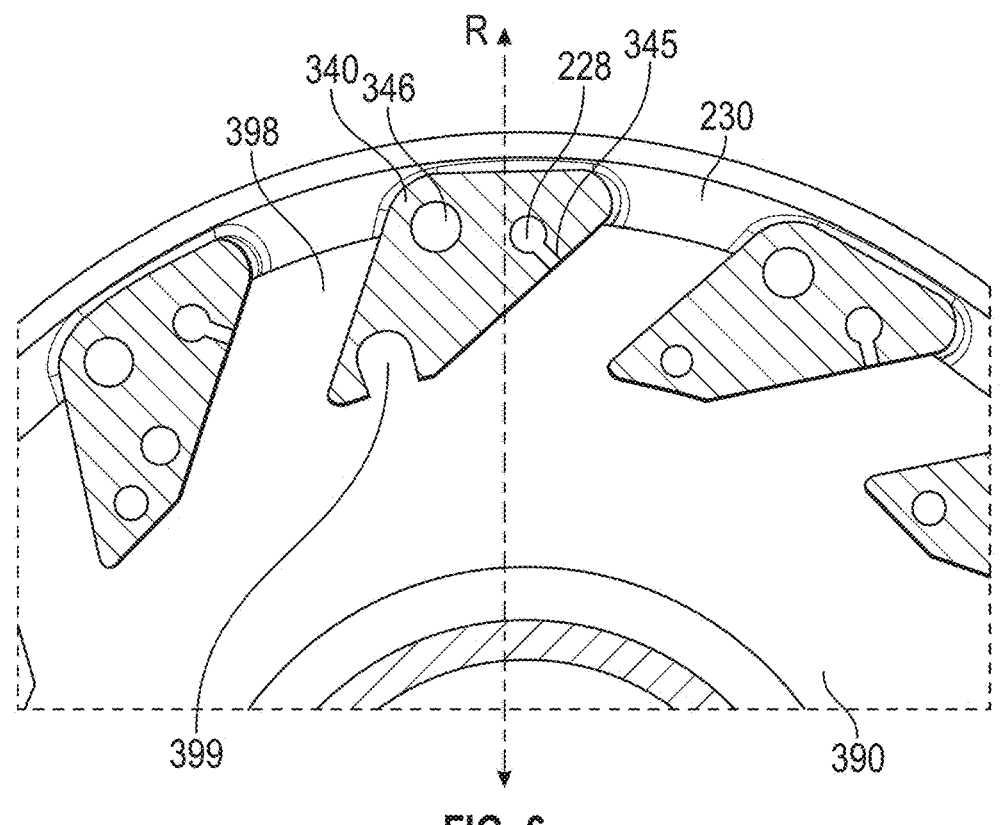
FIG. 6 illustrates a cross-sectional view of a portion of an assembly of a fuel-injection head, along an injector axis, according to an embodiment.

FIG. 6 illustrates a cross-sectional view of a portion of an assembly of fuel-injection head 200, along injector axis A, according to an embodiment. The assembly comprises second portion 230 of the injection body, a subset of vanes 340, and a portion of splitter 390. In this view, the cross section is taken downstream from the upstream end of axial groove 342, such that the U-shaped profile of axial groove 342 and radial tab 399 are illustrated. In addition, it can be seen that radial spokes 398 have a rhomboidal shape that is dictated by the sides of vanes 340. In the illustrated embodiment, fuel outlets 345 are positioned near a radially outward end of one side of each vane 340, so as to inject main fuel into working fluid F, as working fluid F enters the spaces between adjacent vanes 340.

Figure 7:
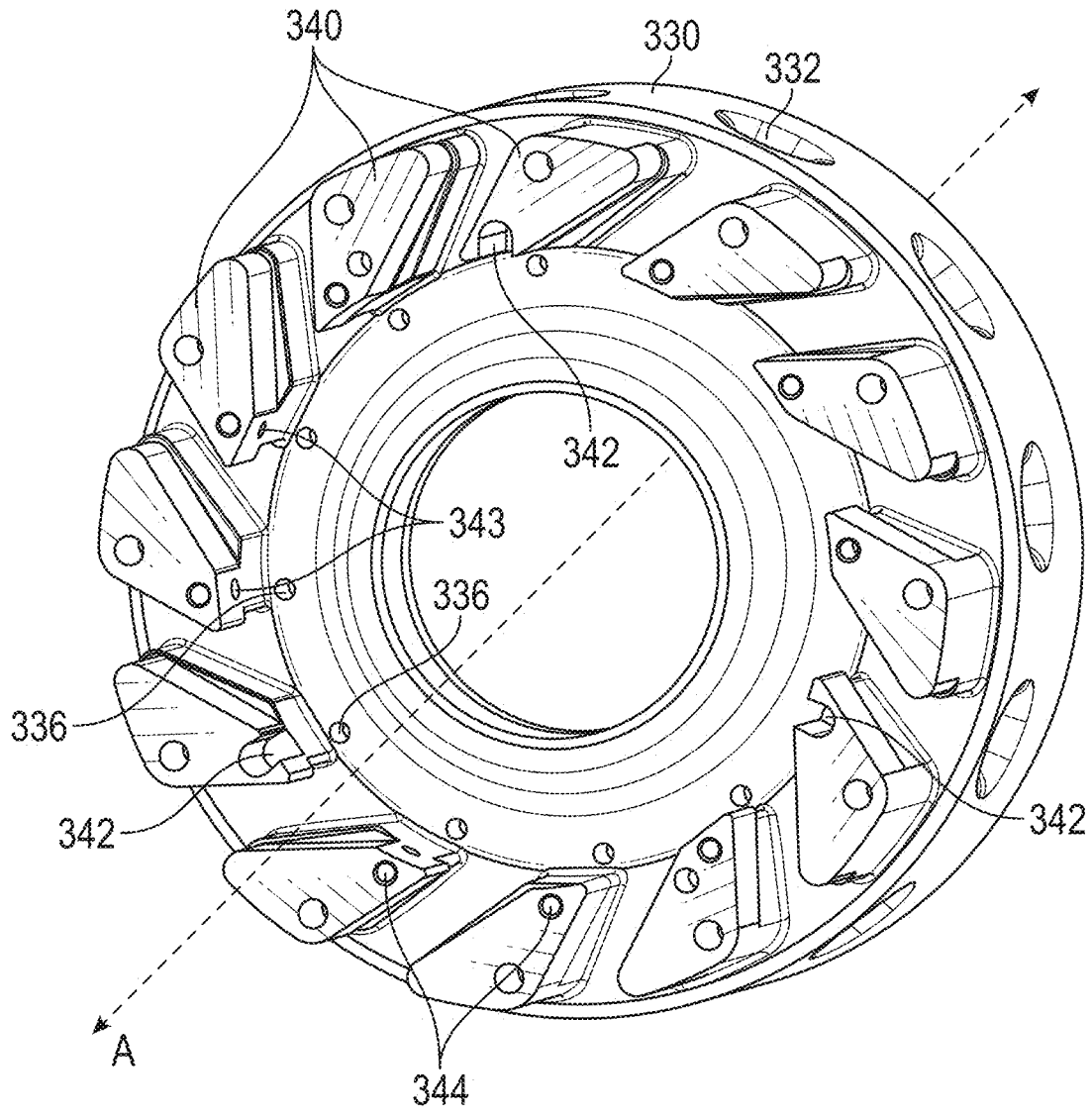
FIG. 7 illustrates a perspective view of an assembly of a fuel-injection head, according to an embodiment.
Figure 8A:
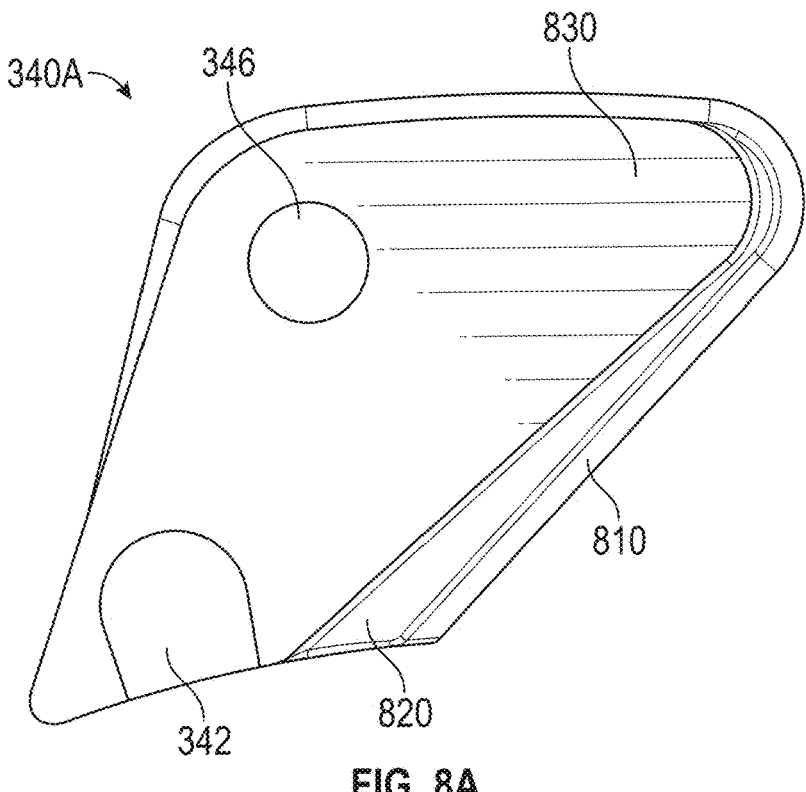
FIGS. 8A-8E illustrates various views of a vane of a fuel-injection head in isolation, according to an embodiment.
Figure 8B:
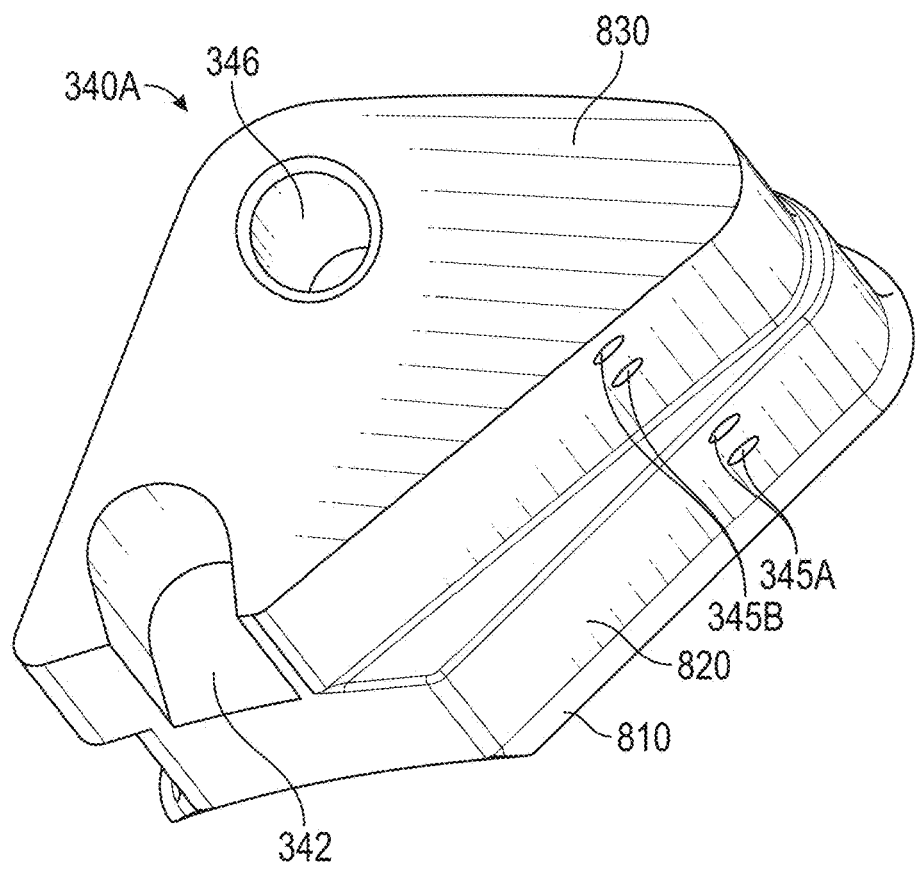
Figure 8C:
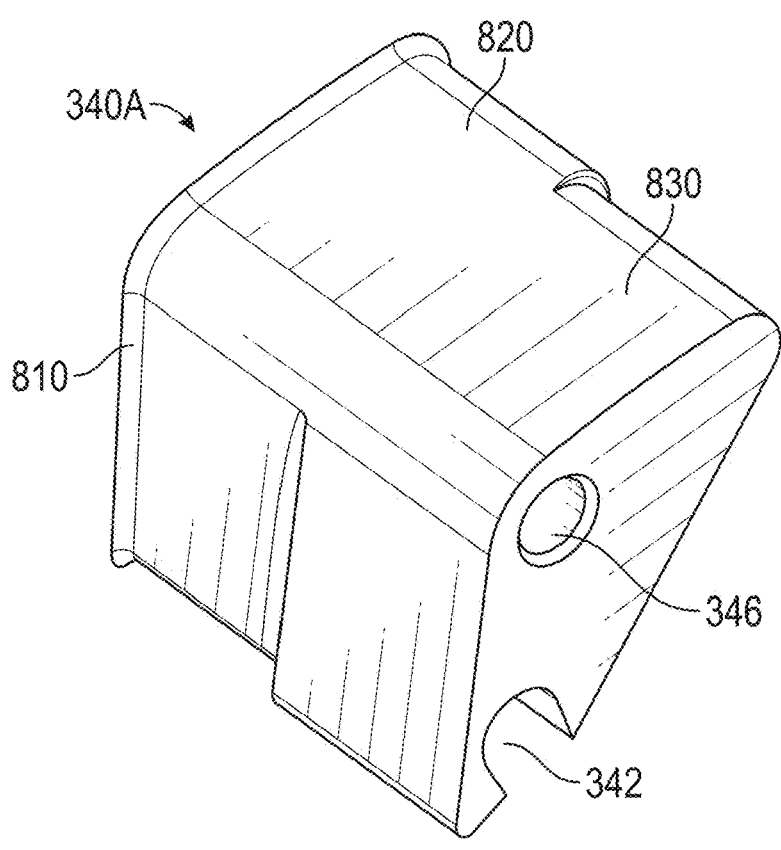
Figure 8D:
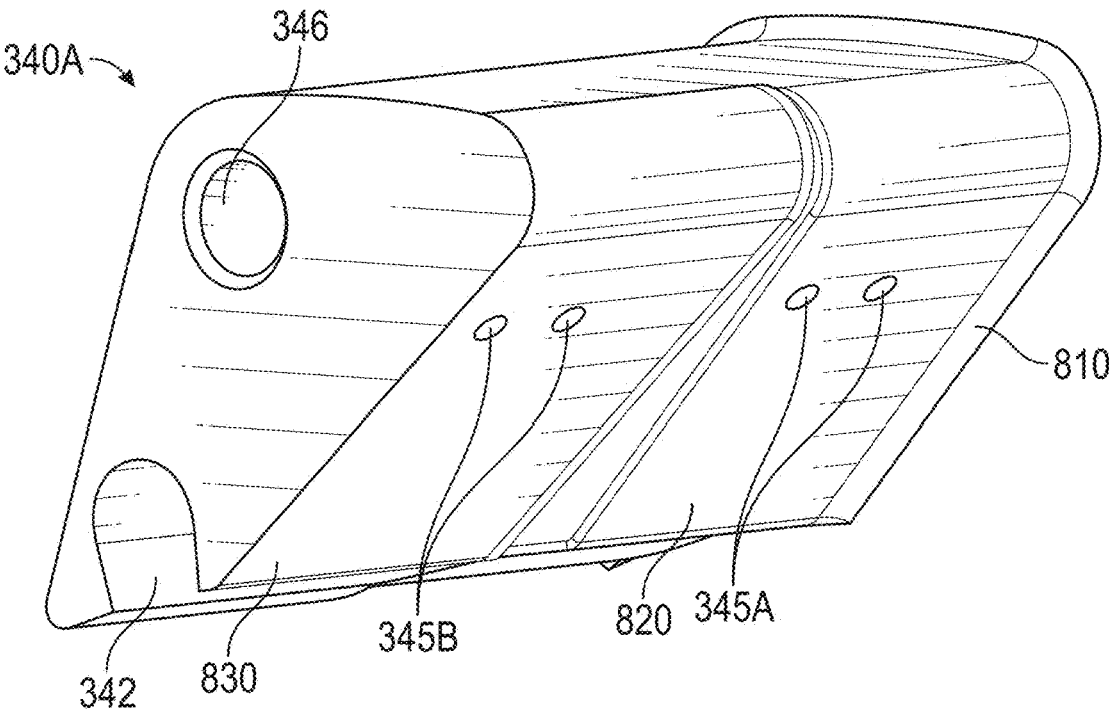
Figure 8E:
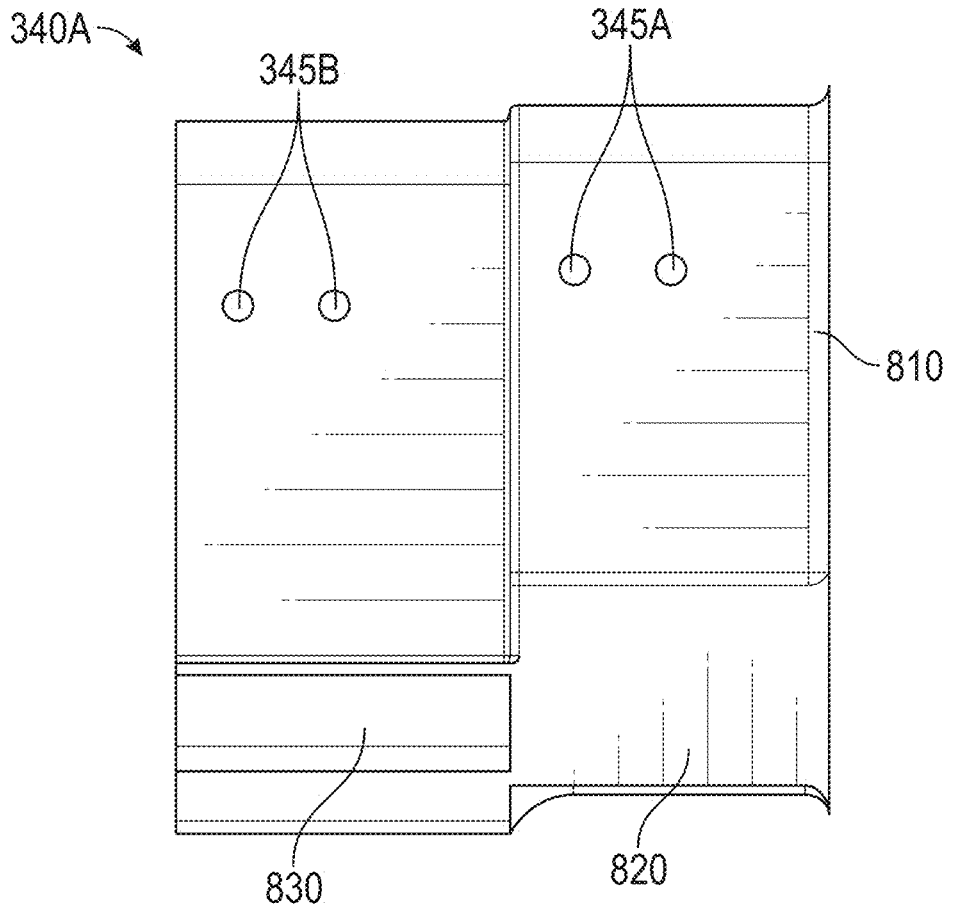

FIG. 7 illustrates a perspective view of an assembly of fuel-injection head 200, according to an embodiment. This assembly comprises second portion 330 of the injection body and the plurality of vanes 340. In this embodiment, there are three vanes 340 that comprise axial grooves 342. Thus, the corresponding splitter 390 will have three radial tabs 399 at aligned positions.

In an embodiment, the angles of the sides of each vane 340, relative to a radial axis R, changes along injector axis A. This angle change may occur at the position at which splitter 390 is fixed when installed with radial tabs 399 fully inserted into axial grooves 342. In other words, the angles of the sides of each vane 340 in first annular passage 219 will differ from the angles of the sides of each vane 340 in second annular passage 229. More generally, for each of the plurality of vanes 340, the curvature at the upstream end of the vane 340 that is in first annular passage 219 differs from the curvature at the downstream end of the vane 340 that is in second annular passage 229. As a result, first annular passage 219 and second annular passage 229 form a double swirler, in which working fluid F flowing through first annular passage 219 will be swirled at a different angle than working fluid F flowing through second annular passage 229. This may result in the swirl factor of first annular passage 219 differing from the swirl factor of second annular passage 229.

FIG. 8 illustrates various views of vane 340A of fuel-injection head 200 in isolation, according to an embodiment. The illustrated vane 340A comprises an axial groove 342.

As illustrated, the upstream end of each vane 340A may comprise a fillet 810, at the connection to the injection body. Fillet 810 may reduce the mechanical stresses at the connection between vane 340A and the injection body.

Each vane 340A may comprise an upstream section 820 that is positioned within first annular passage 219, and a downstream section 830 that is positioned within second annular passage 229. Upstream section 820 has a different angle or other curvature than downstream section 830. For example, from a radially outermost end to a radially innermost end of each vane 340, downstream section 830 may curve at a more acute angle on a side of vane 340A that comprises fuel outlets 345, and/or curve at a more obtuse angle on the opposite side of vane 340A that does not comprise fuel outlets 345. This may produce a higher swirl factor in second annular passage 229 than in first annular passage 219. In an alternative embodiment, the angles may be reversed, such that a higher swirl factor is produced in first annular passage 219 than in second annular passage 229.

As illustrated, the upstream end of axial groove 342 may correspond to the downstream end of upstream section 820, so that splitter 390 is fixed at the dividing point, along injector axis A, between upstream section 820 and downstream section 830. In the illustrated embodiment, there are two fuel outlets 345 in both upstream or first subset 345A and downstream or second subset 345B. However, in an alternative embodiment, there may be a different number of fuel outlets 345 in subsets 345A and 345B, and/or there may be a different number of fuel outlets in first subset 345A than in second subset 345B.

Figure 9:
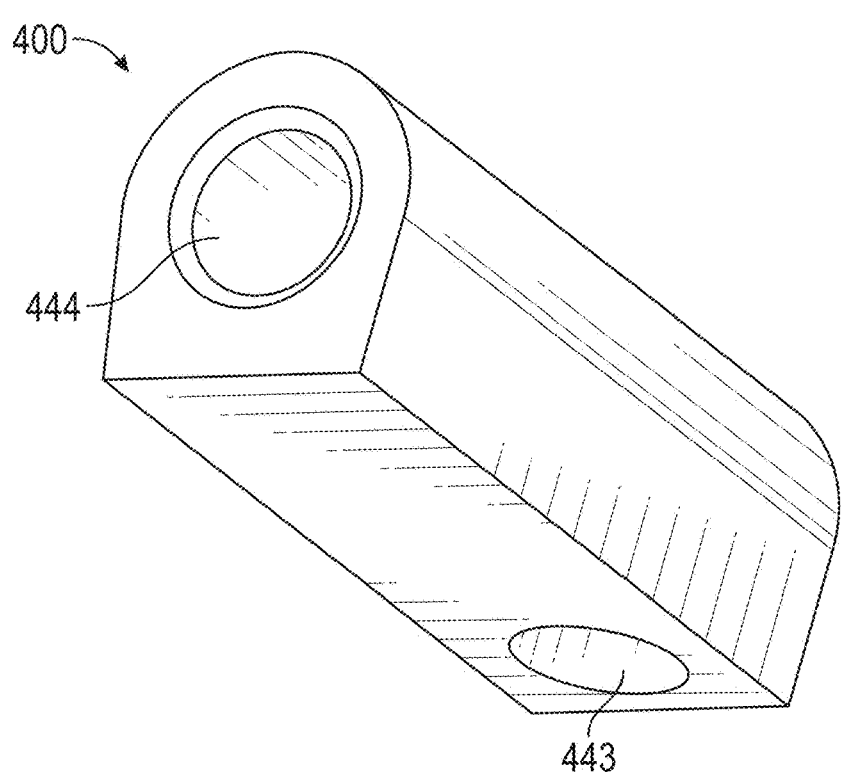
FIG. 9 illustrates a view of an insert in isolation, according to an embodiment.

FIG. 9 illustrates a view of an insert 400 in isolation, according to an embodiment. An insert 400 may be inserted into axial groove 342 of every vane 340 that comprises axial groove 342. Accordingly, it should be understood that the outer shape and dimensions of insert 400 will match the shape and dimensions of axial groove 342.

Insert 400 comprises axial aperture 444 through a downstream surface, and a radial outlet 443 through a radially inner surface that faces injector axis A. Axial aperture 444 is in fluid communication with radial outlet 443 via an internal channel within insert 400. Thus, working fluid F, entering axial aperture 444 via an aligned axial aperture 354 in flange 352 of barrel 350, may flow through the internal channel and out of radial outlet 443 into second annular passage 229. It should be understood that axial aperture 444 and radial outlet 443, in vanes 340 which house an insert within axial groove 342, perform the same function as axial aperture 344 and radial outlet 343, respectively, in vanes 340 which do not comprise axial groove 342.

Figure 10:
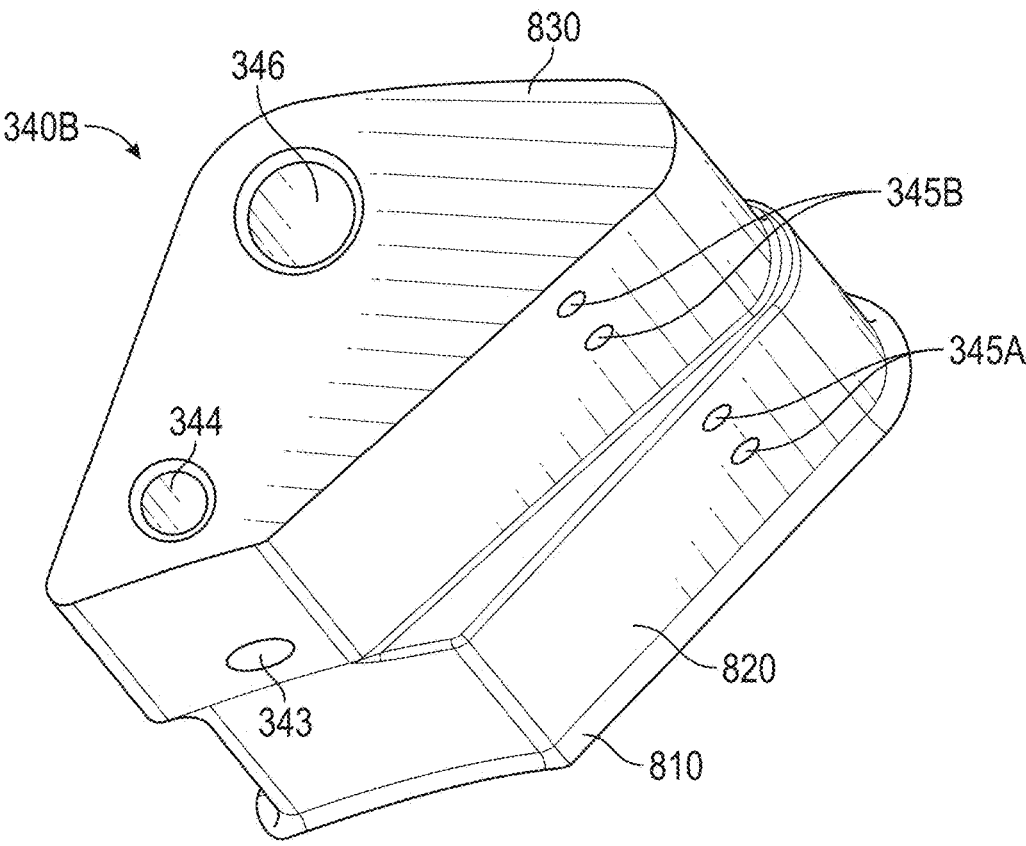
FIG. 10 illustrates a view of a vane of a fuel-injection head in isolation, according to an embodiment.

FIG. 10 illustrates a view of vane 340B of fuel-injection head 200 in isolation, according to an embodiment. The illustrated vane 340B does not comprise an axial groove 342. Where vane 340A comprises an axial groove 342, vane 340B instead comprises aperture 344 which is in fluid communication with an internal channel that is in fluid communication with radial outlet 343. Thus, gas may flow axially into aperture 344, through the internal channel, and radially out of outlet 343. In every other respect, vane 340B may be identical to vane 340A.

INDUSTRIAL APPLICABILITY

Disclosed embodiments comprise a splitter 390, in an annular passage of fuel-injection head 200 that provides radial swirling of an air-fuel mixture through a plurality of vanes 340. Splitter 390 splits the annular passage into a first annular passage 219 and a second annular passage 229. In addition, fuel injector 134 may be configured to provide a primary or first main-fuel stream to first annular passage 219, and a secondary or second main-fuel stream to second annular passage 229, which is radially outward from first annular passage 219. Thus, two distinct passages are formed for potentially two distinct air-fuel mixtures, which allows for internal fuel staging during operation of gas turbine engine 100. This internal fuel staging may allow for an extension of the exhaust emission warranty at lower engine loads, without impacting the efficiency of gas turbine engine 100 at part load (i.e., operating at less than full capacity).

The amount or rate of main fuel supplied to first annular passage 219 and second annular passage 229 may be independently controllable, such that the air-fuel mixtures in first annular passage 219 and second annular passage 229 may be independently controlled. Thus, during operation of fuel injector 134, while gas turbine engine 100 is at part load, the main fuel may be biased towards the radially-inner first annular passage 219. In other words, main fuel may be supplied to first annular passage 219 at a higher rate than second annular passage 229. This may enhance the interaction with pilot fuel, being supplied via the pilot-fuel injection system during part load, to thereby increase the part-load efficiency of gas turbine engine 100.

In addition, disclosed embodiments utilize gas streams to purge fuel away from surfaces inside the annular passage. In particular, axial gas channel 336 injects working fluid F, which may be compressed air from compressor 120, into first annular passage 219 at the boundary between radial portion R1 and transitional portion T1 (e.g., slightly within radial portion R1, exactly between radial portion R1 and transitional portion T1, slightly within transitional portion T1, etc.). The injected working fluid F flows along the radially inner surface of first annular passage 219, which is the radially outer surface of premix tube 380, to purge fuel, injected by fuel outlets 345A, away from the radially outer surface of premix tube 380. In addition, radial outlets 343 of vanes 340 inject working fluid F, which again may be compressed air from compressor 120, into second annular passage 229 at the boundary between radial portion R2 and transitional portion T2 (e.g., slightly within radial portion R2, exactly between radial portion R2 and transitional portion T2, slightly within transitional portion T2, etc.). The injected working fluid F flows along the radially inner surface of second annular passage 229, which is the radially outer surface of splitter 390, to purge fuel, injected by fuel outlets 345B, away from the radially outer surface of splitter 390. This use of working fluid F to purge fuel away from the internal surfaces of fuel-injection head 200 can increase the efficiency and longevity of fuel-injection head 200.

Certain embodiments of fuel injector 134 may be described as an internally variable, fuel-staged, double-swirler, lean premixed injector. It should be understood that first annular passage 219 and second annular passage 229 provide the double swirler, and that the separate systems for supplying fuel to these passages provides the internal variability and fuel staging. Premixing refers to the process of mixing fuel and working fluid F (e.g., air) at high speeds to create a lean, premixed injection of a gaseous fuel-air mixture into combustor 130.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a gas turbine engine, it will be appreciated that it can be implemented in various other types of turbomachines and machines with fuel injectors, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

LIST OF ELEMENTS

Title: Internally Variable Fuel Staged Double Swirler Lean Premixed Injector
- 100 gas turbine engine
- 102 shaft
- 104 power output coupling
- 110 inlet
- 112 annular flow path
- 120 compressor
- 122 compressor rotor assembly
- 124 compressor stator assembly
- 130 combustor
- 132 combustor case
- 134 fuel injector
- 136 combustion chamber
- 140 turbine
- 142 turbine rotor assembly
- 144 turbine stator assembly
- 150 exhaust outlet
- 152 exhaust diffuser
- 154 exhaust collector
- 200 fuel-injection head
- 202 flange
- 204 distribution block
- 212 first main-fuel fitting
- 214 first main-fuel tube
- 215 first fuel cavity
- 216 first perforated plate
- 217 first fuel gallery
- 218 first fuel-injection channels
- 219 first annular passage
- 222 second main-fuel fitting
- 224 second main-fuel tube
- 225 second fuel cavity
- 226 second perforated plate
- 227 second fuel gallery
- 228 second fuel-injection channels
- 229 second annular passage
- 230 tube stem
- 232 pilot-fuel fitting
- 234 pilot-fuel channel
- 235 pilot-fuel gallery
- 310 outer cap
- 320 first portion
- 325 radially inner section
- 330 second portion
- 332 radial gas channel
- 334 radial aperture
- 336 axial gas channel
- 340 vane
- 342 axial groove
- 343 radial outlet
- 344 axial aperture
- 345 fuel outlet
- 346 aperture
- 350 barrel
- 352 flange
- 354 axial aperture
- 356 fastener

- 360 pilot tube
- 365 pilot-fuel channel
- 370 central tube
- 372 pilot block
- 374 pilot premix area
- 375 annular gas channel
- 380 premix tube
- 384 engagement members
- 386 radial pin
- 390 splitter
- 392 radial section
- 394 transitional section
- 396 axial section
- 398 radial spoke
- 399 radial tab
- 400 insert
- 443 radial outlet
- 444 axial aperture
- 810 fillet
- 820 upstream section
- 830 downstream section

What is claimed is:

1. A fuel-injection head comprising:
a premix tube extending downstream from an injection body, the premix tube including at least one engagement member configured to engage with at least one corresponding engagement member of the injection body to removably couple the premix tube to the injection body;
a plurality of vanes extending downstream from the injection body, wherein the plurality of vanes are arranged annularly around an upstream end of the premix tube;
a barrel extending downstream from the plurality of vanes, wherein the barrel is annular around a downstream end of the premix tube, so as to define an annular passage that comprises a radial portion that extends radially through the plurality of vanes, an axial portion that extends axially between the barrel and the downstream end of the premix tube, and a transitional portion that transitions between the radial portion and the axial portion;
a splitter that splits the annular passage into a first annular passage and a second annular passage,
wherein the splitter comprises a radial section within the radial portion of the annular passage, an axial section within the axial portion of the annular passage, and a transitional section that transitions between the radial section and the axial section within the transitional portion of the annular passage,
wherein the radial section of the splitter comprises a plurality of radial spokes,
wherein each of the plurality of radial spokes extends between an adjacent pair of the plurality of vanes,
wherein the radial section comprises one or more radial tabs,
wherein each of the one or more radial tabs extends into an axial groove within a respective one of the plurality of vanes, and
one or more inserts, wherein each of the one or more inserts is positioned downstream from a respective one of the one or more radial tabs and within the axial groove within the respective vane.
2. The fuel-injection head of claim 1, wherein the splitter extends radially into the radial portion of the annular passage, such that, in the radial portion of the annular passage, the first annular passage is upstream from the second annular passage.

3. The fuel-injection head of claim 2, wherein, for each of the plurality of vanes, a curvature at an upstream end of the vane that is in the first annular passage differs from a curvature at a downstream end of the vane that is in the second annular passage.

4. The fuel-injection head of claim 2, wherein the splitter extends axially into the axial portion of the annular passage, such that, in the axial portion of the annular passage, the first annular passage is radially inward from the second annular passage.

5. The fuel-injection head of claim 1, wherein each of the plurality of vanes comprises a plurality of fuel outlets.

6. The fuel-injection head of claim 5, wherein, for each of the plurality of vanes, the plurality of fuel outlets are arranged in at least one row that extends axially along a side of the vane that faces the radial portion of the annular passage.

7. The fuel-injection head of claim 6, wherein the splitter extends radially into the radial portion of the annular passage, such that, in the radial portion of the annular passage, the first annular passage is upstream from the second annular passage, and wherein the splitter further splits the at least one row into an upstream subset of the plurality of fuel outlets that is in fluid communication with the first annular passage and a downstream subset of the plurality of fuel outlets that is in fluid communication with the second annular passage.

8. The fuel-injection head of claim 7, wherein the injection body comprises a first fuel gallery that is in fluid communication with the upstream subset and a second fuel gallery that is in fluid communication with the downstream subset.

9. The fuel-injection head of claim 1, wherein a number of the plurality of radial spokes is equal to a number of the plurality of vanes, such that each adjacent pair of the plurality of vanes has a respective one of the plurality of radial spokes extending therebetween.

10. The fuel-injection head of claim 1, wherein the barrel comprises a flange that is fixed to a downstream end of each of the plurality of vanes, so as to fix each of the one or more radial tabs and each of the one or more inserts within the axial groove within the respective vane, wherein the flange comprises a plurality of axial apertures arranged annularly around an injector axis of the fuel-injection head, wherein each of the plurality of axial apertures in the flange is aligned with an axial aperture in a corresponding one of the plurality of vanes, and wherein each of the axial apertures in the plurality of vanes is in fluid communication with a radial aperture that extends radially into the second annular passage at a boundary between the radial portion and the transitional portion.

11. The fuel-injection head of claim 1, wherein the injection body comprises a plurality of axial channels that extend axially into the first annular passage at a boundary between the radial portion and the transitional portion.

12. A fuel injector comprising:
the fuel-injection head of claim 1;
a first fuel inlet that is in fluid communication with the first annular passage; and
a second fuel inlet that is in fluid communication with the second annular passage.

13. A gas turbine engine comprising:
a compressor;
a combustor downstream from the compressor, wherein the combustor comprises a plurality of the fuel injector of claim 12, arranged annularly around a longitudinal axis of the gas turbine engine; and
a turbine downstream from the combustor.

14. A fuel-injection head comprising:
a premix tube extending downstream from an injection body, the premix tube including at least one engagement member configured to engage with at least one corresponding engagement member of the injection body to removably couple the premix tube to the injection body;
a plurality of vanes extending downstream from the injection body, wherein the plurality of vanes are arranged annularly around an upstream end of the premix tube;
a barrel extending downstream from the plurality of vanes, wherein the barrel is annular around a downstream end of the premix tube, so as to define an annular passage that comprises a radial portion that extends radially through the plurality of vanes, an axial portion that extends axially between the barrel and the downstream end of the premix tube, and a transitional portion that transitions between the radial portion and the axial portion; and
a splitter that splits the annular passage into a first annular passage and a second annular passage,
wherein the premix tube is removable from the injection body, and wherein the fuel-injection head further comprises the injection body,
wherein the injection body comprises a threaded aperture, and wherein an upstream end of the premix tube comprises the at least one engagement member, the at least one engagement member including a threaded radially outward facing surface that is configured to mate with the threaded aperture,
wherein the injection body further comprises at least one radial aperture that radially extends through a radially outward facing surface of the injection body, through the injection body, and into the threaded aperture, and
wherein the fuel-injection head further comprises a radial pin that engages with the threaded radially outward facing surface of the premix tube, through the at least one radial aperture, to thereby prevent rotation of the premix tube with respect to the injection body.

* * * * *